United States Patent [19]

Michael

[11] 4,077,281

[45] Mar. 7, 1978

[54] TRANSMISSION

[75] Inventor: Richard Arlo Michael, Waterloo, Iowa

[73] Assignee: Deere & Company, Moline, Ill.

[21] Appl. No.: 752,746

[22] Filed: Dec. 21, 1976

[51] Int. Cl.² ............................................. F16H 57/10
[52] U.S. Cl. ........................................ 74/760; 74/761
[58] Field of Search ........................ 74/760, 761, 753

[56] References Cited

U.S. PATENT DOCUMENTS

| | | | |
|---|---|---|---|
| 1,217,059 | 2/1917 | Pollard | 74/761 |
| 1,231,529 | 6/1917 | Pollard | 74/761 |
| 2,599,559 | 6/1952 | Kelbel | 74/760 |
| 2,901,923 | 9/1959 | Waclawek | 74/761 X |
| 3,215,003 | 11/1965 | Gorshkoff | 74/760 |
| 3,857,303 | 12/1974 | Mouttet | 74/761 |

FOREIGN PATENT DOCUMENTS

| | | | |
|---|---|---|---|
| 995,233 | 6/1965 | United Kingdom | 74/760 |

Primary Examiner—Samuel Scott
Assistant Examiner—Lance W. Chandler

[57] ABSTRACT

A planetary transmission for selectively shifting among four forward speed ratios includes a first ring gear secured to a drive shaft and encircling a single planet carrier which is secured to the driven shaft. The first ring gear meshes with a carrier journaled first planet gear set which meshes with a driven shaft-encircling first sun gear. The first planet gear set further meshes with a carrier journaled second planet gear set which has integrally connected thereto a third planet gear set. The third planet gear set meshes with a second sun gear and an encircling second ring gear. First, second, and third brakes are respectively connected to the second ring gear, the first sun gear, and the second sun gear to stop and allow rotation of said gears to provide three forward speed ratios between drive and driven shafts. A clutch is provided between the second sun gear and the planet carrier to selectively cause common rotation thereof to provide a fourth forward speed ratio.

11 Claims, 2 Drawing Figures

TRANSMISSION

BACKGROUND OF THE INVENTION

The present invention relates generally to vehicle power shift transmissions and more particularly to a planetary transmission which is capable of being shifted between four forward speeds.

In the past, a number of different planetary transmission arragements have been developed to provide various speed ratios as exemplified by the U.S. Pat. No. 2,697,367 granted to M. P. Winther which provides four forward and one reverse speeds with three brakes and two clutches. The ultimate aim of these arrangements has been to provide a maximum number of speed ratios with a minimum number of control elements such as brakes and clutches.

SUMMARY OF THE INVENTION

The present invention provides a four forward speed planetary transmission requiring a minimum number of gears, brakes, and clutches. A drive shaft is provided with a ring gear for driving a planet gear set journaled in a planet carrier secured to a driven shaft. The planet gear set is selectively rotated to drive the planet carrier by meshing with a brake-associated, first sun gear and by meshing with a carrier-journaled, compound planetary gear set which meshes with a brake-associated ring gear and a brake-associated second sun gear. The planet gear set is selectively prevented from rotating to provide a direct drive from the drive shaft to the driven shaft by clutching the carrier to the second sun gear.

DESCRIPTION OF THE PREFERRED EMBODIMENT

Figure 1:
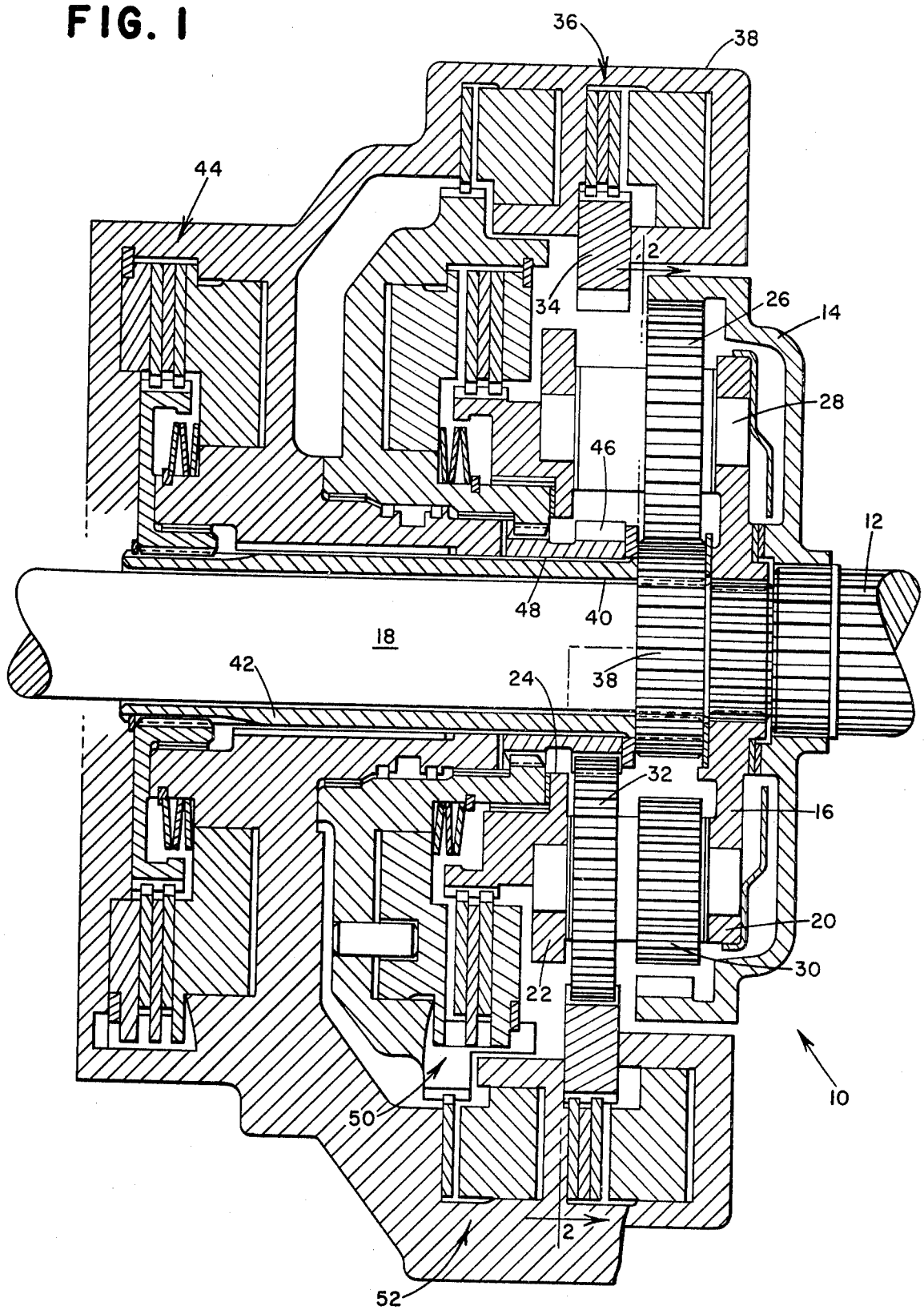
FIG. 1 is a diagrammatic longitudinal view, partially in section, of the planetary transmission of the present invention.

Referring now to FIG. 1, therein is shown a planetary transmission generally designated by the numeral 10. The transmission 10 is driven by a drive shaft 12 which is generally connected to an internal combustion engine (not shown). The drive shaft 12 is splined to a first ring gear 14 which partially envelops a planet carrier 16. The planet carrier 16 is splined to a driven shaft 18 and is positioned rearwardly of the drive shaft 12. The expression "rearwardly" is used on the basis of a typical fore and aft disposition of the transmission 10 in a vehicle; however, it will be realized that such expressions are used solely for the purposes of convenience and not by way of limitation.

The planet carrier 16 has front and rear walls 20 and 22, respectively, with the rear wall 22 provided with an opening 24. The carrier 16 has means rigidly interconnecting the front and rear walls 20 and 22, and this means includes several shafts, for carrying planet gears to be hereinafter described, together with circumferentially spaced wall portions.

Figure 2:
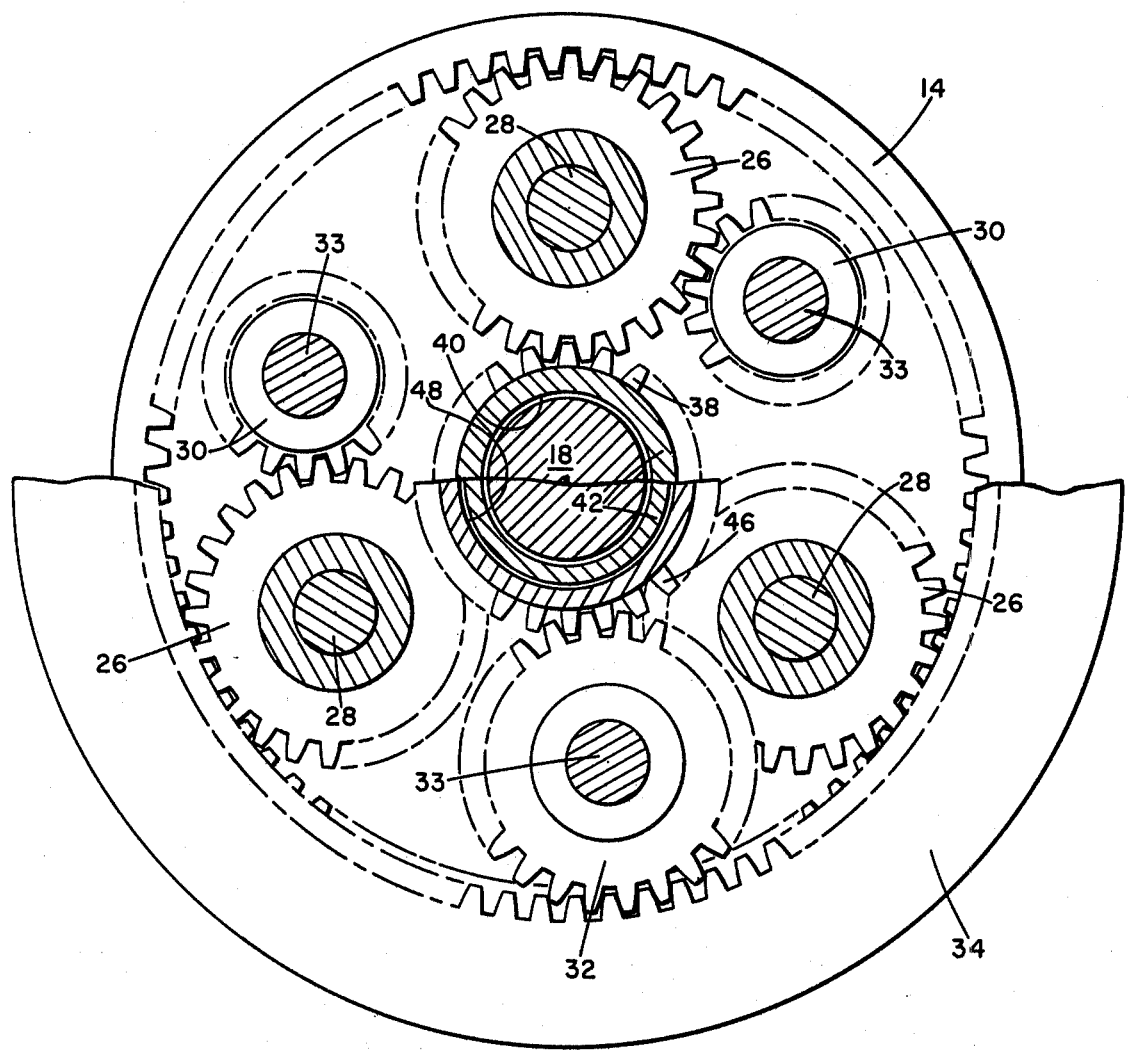
FIG. 2 is a cross-sectional view taken along the line 2—2 of FIG. 1.

The first ring gear 14 meshes with a first planet gear set 26 which consists of three gears as shown in FIG. 2 and which are bearing-mounted on a set of three equilaterally spaced first shafts 28. The first planet gear set 26 meshes with a second planet gear set 30 which consists of three gears and which has integral therewith a third planet gear set 32 which also consists of three gears and which are commonly bearing-mounted on a set of three equilaterally spaced second shafts 33. The third planet gear set 32 extends through openings in the carrier 16 to floatingly carry a second ring gear 34 which is associated with a first brake 36 having conventional components which allow the second ring gear 34 to be selectively braked and released relative to a transmission housing 38.

The first planet gear set 26 further meshes with a first sun gear 38 having a central aperture 40 through which the output shaft 18 extends. The first sun gear 38 is further connected by a hollow shaft 42 to a second brake 44 having conventional components which allow the first sun gear 38 to be selectively braked and released relative to the transmission housing 38.

The third planet gear set 32 further meshes with a second sun gear 46 which has an aperture 48 through which the shaft 42 extends. The second sun gear 46 has a hollow shaft portion 48 which connects it to a clutch 50 having conventional components for coupling the second sun gear 46 to the carrier 16 along the rearward periphery thereof. Concentric with the clutch 50 is a third brake 52 having conventional components which allow the second sun gear 46 to be selectively braked and released relative to the transmission housing 38.

From the description thus far, and noting that the input drive shaft 12 may be connected to a power source such as an internal combustion engine by a clutch or other torgue transmitting mechanism, it will be seen that the drive shaft 12 may be regarded as a constantly rotating part.

A first forward speed is obtained by braking the first brake 36. The rotation of the drive shaft 12 is transmitted through the first ring gear 14 to cause rotation of the first planet gear set 26 and the meshing second planet gear set 30 and its accompanying third planet gear set 32. Since the second ring gear 34 is braked, the third planet gear set 32 will translate as it rotates causing the planet carrier 16 to rotate the drive shaft 18.

A second forward speed is obtained by braking the second brake 44. The rotation of the drive shaft 12 is transmitted through the first ring gear 14 which causes rotation of the first planet gear set 26 and translation thereof since it meshes with the braked first sun gear 38. The translation of the first planet gear set 26 causes rotation of the planet carrier 16 and thus of the driven shaft 18.

A third forward speed, which is a direct drive, is obtained by activating the clutch 50 which couples the second sun gear 46 to the planet carrier 16. This coupling prevents rotation of the first, second, and third planet gear sets 26, 30, and 32, and causes the drive shaft 12 to drive directly through the first ring gear 14 to a nonrotating first planet gear set 26 which is translationally carried by the planet carrier 16 so as to drive the driven shaft at the same speed as the drive shaft 12.

A fourth forward speed is obtained braking the third brake 52. The rotation of the drive shaft 12 is transmitted through the first ring gear 14 to cause the first planet gear set 26 to rotate. The rotation of the first planet gear set 26 is transmitted to its meshed second planet gear set 30 and thence to the accompanying third planet gear set 32 which is meshed with the second sun gear 46. With the second sun gear 46 being braked, the third planet gear set 32 is forced to translate as it rotates, thus, rotating the planet carrier 16 which drives the driven shaft 18.

As evident to those skilled in the art, the number of teeth selected for each of the gears is chosen so as to provide four different, desired speed ratios.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. A transmission comprising: A drive shaft; a driven shaft; first and second planetary units having a rotatable planet carrier secured to the driven shaft; said first planetary unit including a first rotatable ring gear secured to the drive shaft, a first sun gear encircling the driven shaft and concentric with the first ring gear, and a first planet gear journaled in the planet carrier meshing with the first ring gear and the first sun gear; said second planetary unit including a second sun gear encirling the driven shaft and axially spaced from the first sun gear, a second rotatable ring gear concentric with said second sun gear, a second planet gear journaled in the planet carrier meshing with the first planet gear, and a third planet gear integral with the second planet gear and coaxial therewith meshing with the second ring gear and the second sun gear; first, second, and third brake means for selectively braking and releasing the second ring gear, the first sun gear and the second sun gear, respectively, whereby the driven shaft is rotatable at three different forward ratios with respect to the drive shaft.

2. The transmission as claimed in claim 1 including clutch means for selctively coupling and releasing the planet carrier and the second sun gear whereby the driven shaft is rotatable at an additional different forward ratio.

3. The transmission as claimed in claim 1 wherein the drive shaft, the planet carrier, and the driven shaft are coaxial on a fore and aft axis, the second planetary unit is coaxially behind the first planetary unit, the first sun gear is axially hollow and includes a hollow shaft portion with the driven shaft extending coaxially therethrough, and the third brake means is connected to one end of the hollow shaft portion.

4. The transmission as claimed in claim 3 wherein the second sun gear is axially hollow and includes a hollow portion with the hollow shaft portion of the first sun gear extending axially therethrough, and the third brake means is connected to one end of the hollow portion of the second sun gear.

5. The transmission as claimed in claim 4 including clutch means for selectively coupling and releasing the planet carrier and the second sun gear whereby the driven shaft is rotatable at an additional different forward ratio and wherein the hollow portion of the second sun gear includes the clutch means proximate the third brake means and axially spaced between the first and second brake means.

6. A transmission comprising: A drive shaft; a driven shaft; first and second planetary units having a rotatable planet carrier secured to the driven shaft; said first planetary unit including a first rotatable reaction gear secured to the drive shaft, a first driven gear encircling the driven shaft and concentric with the first reaction gear, and a first planet gear journaled in the planet carrier meshing with the first reaction gear and the first driven gear; said second planetary unit including a second driven gear encircling the driven shaft and axially spaced from the first driven gear, a second rotatable reaction gear concentric with said second driven gear, a second planet gear journaled in the planet carrier meshing with the first planet gear, and a third planet gear integral with the second planet gear and coaxial therewith meshing with the second reaction gear and the second driven gear; first, second, and third brake means for selectively braking and releasing the second reaction gear, the first driven gear and the second driven gear, respectively, whereby the driven shaft is rotatable at three different forward ratios with respect to the drive shaft.

7. The transmission as claimed in claim 6 including clutch means for selectively coupling and releasing the planet carrier and the second driven gear whereby the driven shaft is rotatable at an additional different forward ratio.

8. The transmission as claimed in claim 6 wherein the drive shaft, the planet carrier, and the driven shaft are coaxial on a fore and aft axis, the second planetary unit is coaxially behind the first planetary unit, the first driven gear is axially hollow and includes a hollow shaft portion with the driven shaft extending coaxially therethrough, and the second brake means is connected to one end of the hollow shaft portion.

9. The transmission as claimed in claim 8 wherein the second driven gear is axially hollow and includes a hollow portion with the hollow shaft portion of the first driven gear extending axially therethrough, and the third brake means is connected to one end of the hollow portion of the second driven gear.

10. The transmission as claimed in claim 9 including clutch means for selectively coupling and releasing the planet carrier and the second driven gear whereby the driven shaft is rotatable at an additional different forward ratio and wherein the hollow portion of the second driven gear includes the clutch means proximate the third brake means and axially spaced between the first and second brake means.

11. A planetary transmission comprising: a single planetary carrier rotatable on a fore and aft axis and having spaced apart, front and rear walls and means rigidly interconnecting said walls and having openings provided therein exposing the interior of said carrier radially outwardly; a centrally apertured first sun gear within the carrier just behind the front wall; a centrally apertured second sun gear coaxial with the first sun gear within the carrier just forwardly of the rear wall; clutch means for selectively coupling the second sun gear to the planet carrier; first and second relatively rotatable ring gears encircling the carrier and respectively concentric with the first and second sun gears; first brake means for selectively braking and releasing the second ring gear; second and third brake means for selectively braking and releasing, respectively, the first and second sun gear; a first planet gear journaled in the carrier meshing with the first sun gear and the first ring gear via at least one of the aforesaid openings; a second planet gear journaled in the carrier meshing with the first planet gear; a third planet gear integral with the second planet gear meshing with the second sun gear and the second ring gear via at least one of the aforesaid openings; a drive shaft including a portion partially enveloping the carrier and secured to the first ring gear; and a driven shaft extending coaxially through the carrier rear wall and through the first and second sun gear and secured to the carrier.

* * * * *